Jan. 7, 1969     S. A. BULIN     3,420,238

STRAW WALKER

Filed Dec. 9, 1965     Sheet 1 of 3

INVENTOR
SHELLY A. BULIN
BY
    ATT'Y
    AG'T

INVENTOR
SHELLY A. BULIN

Jan. 7, 1969 S. A. BULIN 3,420,238
STRAW WALKER
Filed Dec. 9, 1965 Sheet 3 of 3
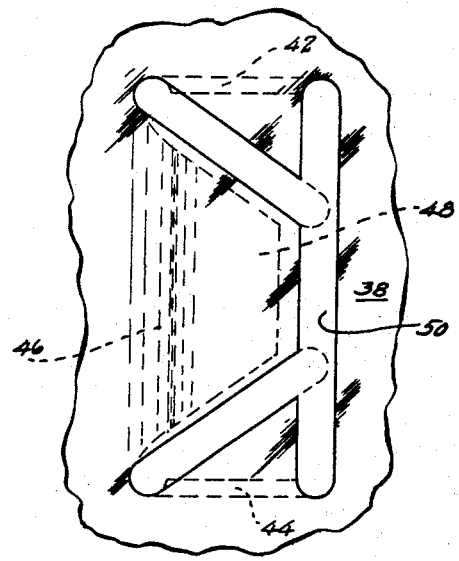
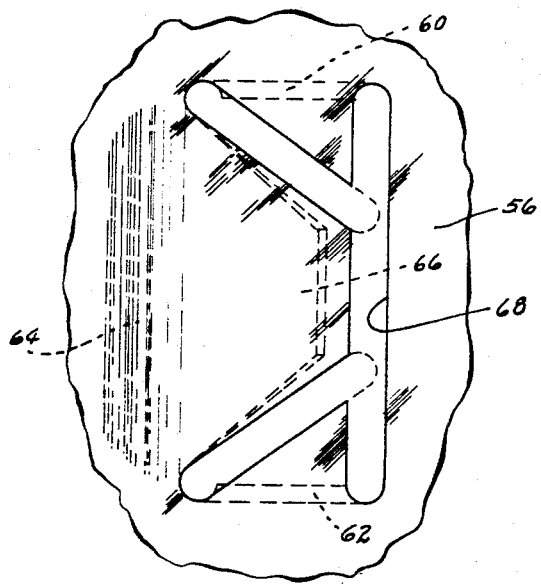
FIG. 10   FIG. 9
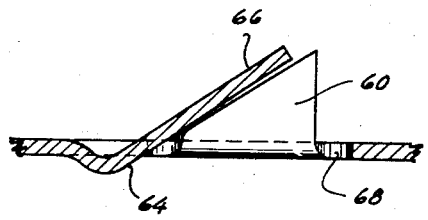
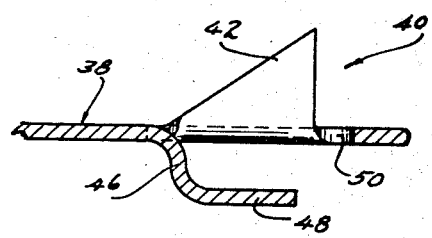
FIG. 7   FIG. 6
INVENTOR
SHELLY A. BULIN
BY United States Patent Office 3,420,238
Patented Jan. 7, 1969

3,420,238
STRAW WALKER
Shelley A. Bulin, Davenport, Iowa, assignor to J. I. Case Company, Racine, Wis., a corporation of Wisconsin
Filed Dec. 9, 1965, Ser. No. 512,621
U.S. Cl. 130—26
Int. Cl. A01f 12/22
9 Claims

ABSTRACT OF THE DISCLOSURE

A straw walker having a planar plate portion with a plurality of openings extending therethrough for passage of the grain. Upstanding tangs or portions extend from the plate portion to a free end thereabove, and there are upright surfaces on the upstanding tangs for advancing the stalks along the plate portion when the latter is reciprocated. Also, there are tangs or portions extending across the openings but in positions offset from the plate portion.

---

The present invention relates to harvesting machines and to the harvesting and separating mechanism which separates the grain from the straw or stalk. Specifically, the invention is an improved straw walker or straw rack grid, which grid is normally rearward of the rotating cylinder of the threshing portion of the machine. The straw separating mechanism usually includes a number of individual rack grids which are lined up side by side, and there are a number of these grids in a fore-and-aft direction to provide for greater harvesting capacity and to separate the grain from the straw in a highly efficient manner.

Prior machines have been generally satisfactory, but improved separating means are desired to increase the combining capacity and the efficiency in the present day machines.

The main object of this invention is to provide a straw walker or straw rack grid which increases the grain open separating area.

Another object is to provide an improved separating mechanism which increases the separating area, and thus the combining capacity.

A further object is to provide a straw rack which eliminates the conventional formed or rounded fish back design.

Another object is to provide a straw rack which utilizes the portions and edges of the material obtained during the manufacturing process, the operation of which forms the openings in the material, and also forms the edged portions.

Figure 2:
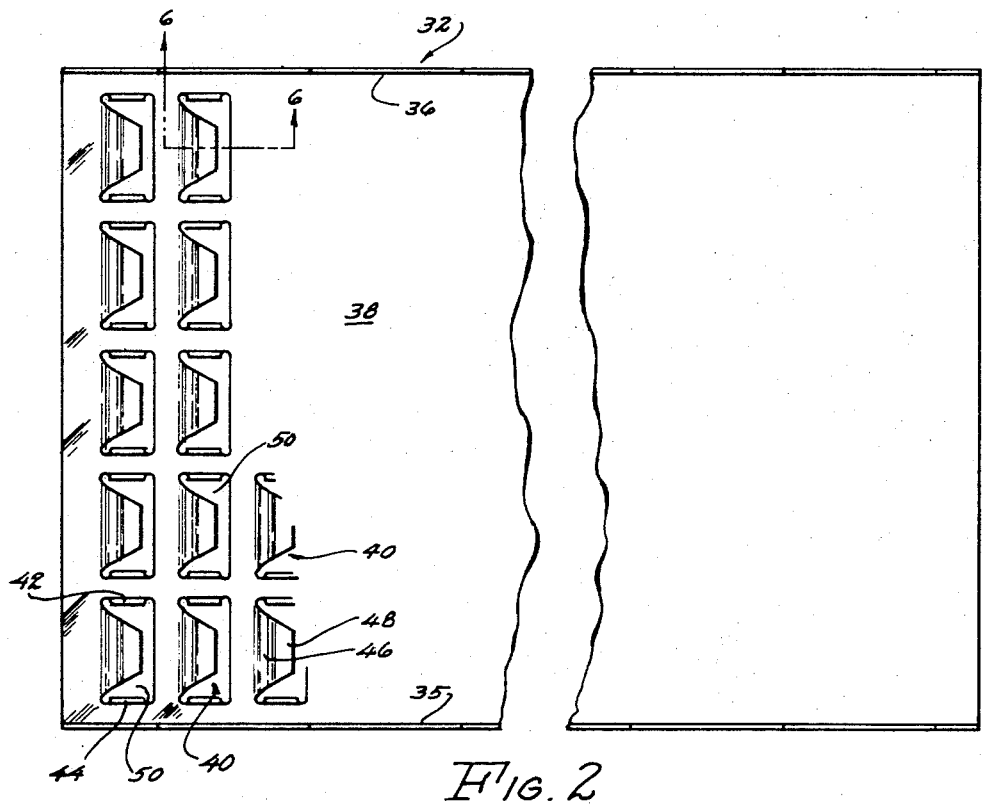
Figure 3:
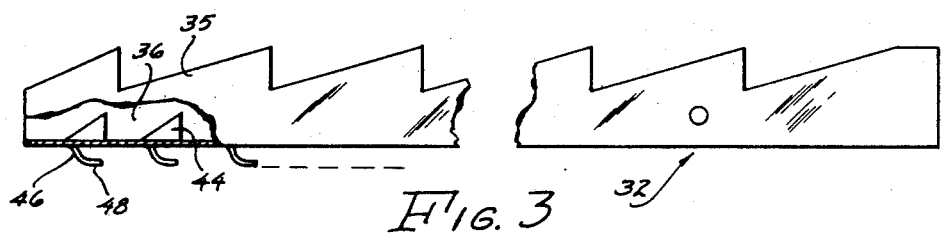
Figure 1:
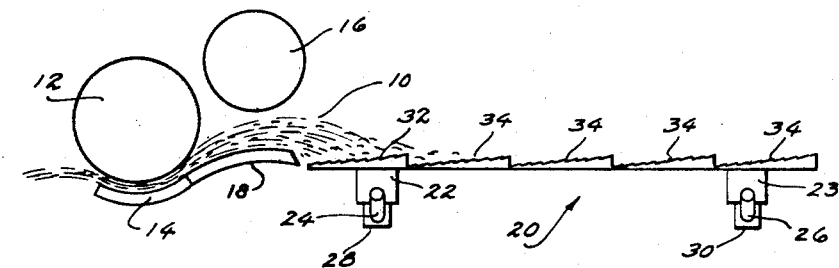
Figure 4:
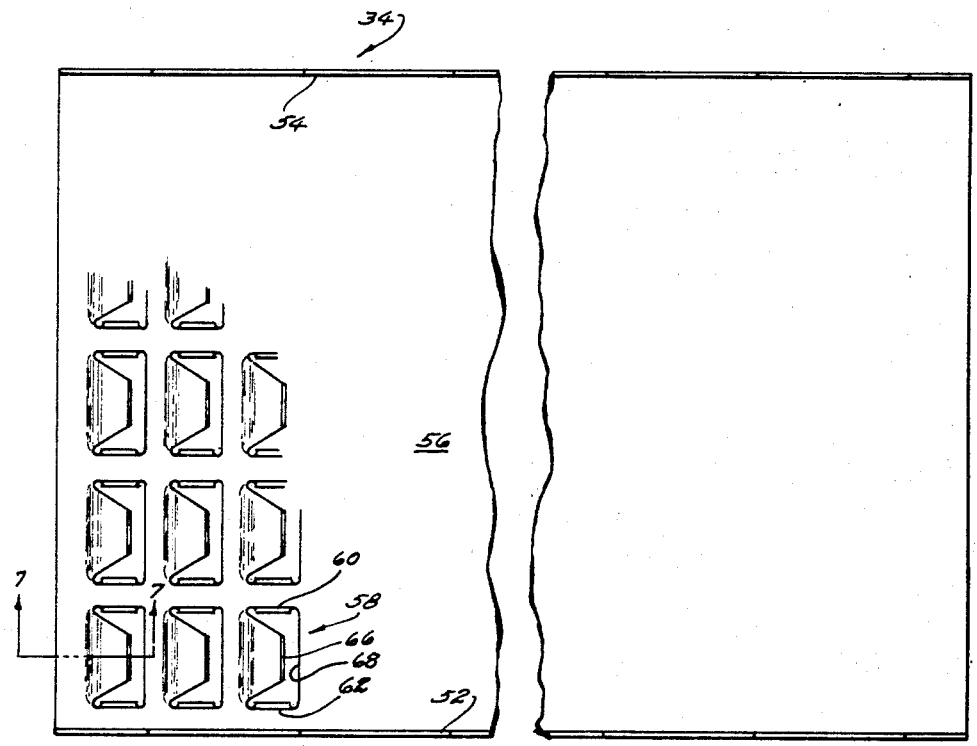
Figure 5:
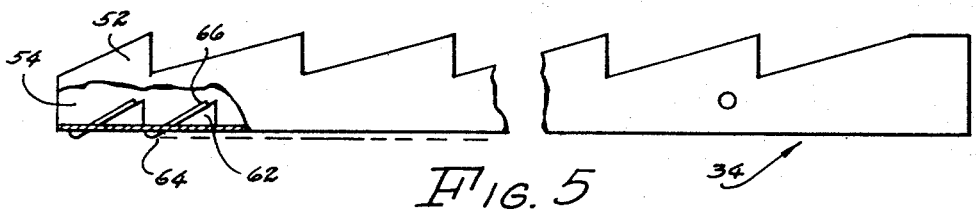
Figure 8:
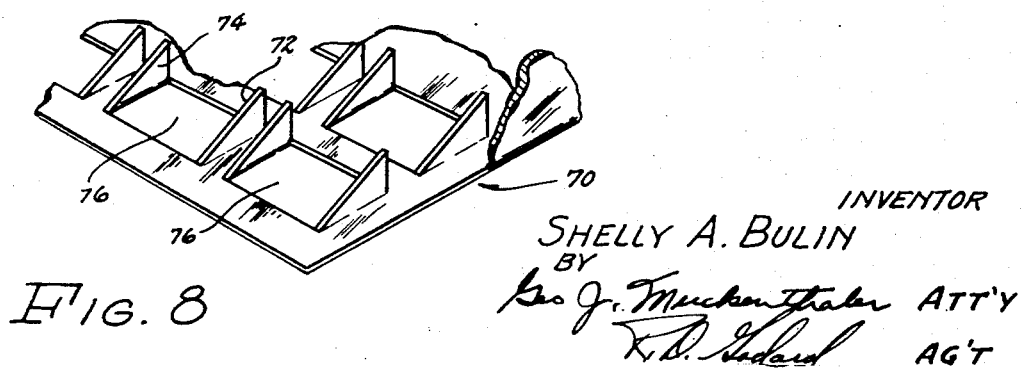

Additional objects and advantages will become apparent from the following specification and the annexed drawings, in which:

FIGURE 1 is a diagrammatic side view of a part of a harvesting machine embodying the present invention;
FIG. 2 is an enlarged plan view of a fragment of the straw rack grid;
FIG. 3 is a side view of the straw rack grid seen in FIG. 2;
FIG. 4 is a plan view of a fragment of a modification of the straw rack grid;
FIG. 5 is a side view of the straw rack grid seen in FIG. 4;
FIG. 6 is an enlarged view taken on the line 6—6 of FIG. 2;
FIG. 7 is an enlarged view taken on the line 7—7 of FIG. 4;
FIG. 8 is a perspective view showing a fragment of a grid having an extreme open grain area;
FIG. 9 is a plan view of the pattern of the embodiment in FIG. 6 and showing the cut-out or punching design and also showing, in dotted lines, the portions after bending and forming; and FIG. 10 is similar to FIG. 9, but showing the embodiment of FIG. 7.

As seen in FIG 1, the invention is utilized as a part of the threshing mechanism of a combine, the crop material 10 being moved in a rearward direction under a cylinder 12 and above a concave 14, and then being further threshed by reason of contacting a beater 16, the crop material then moving rearward across a pan 18 and onto a separating mechanism. The threshing cylinder 12, the concave 14, and the beater 16 are conventional parts of a threshing mechanism and need not be further described as they form no part of the present invention. When the crop material 10 has passed to the right of beater 16, most of the grain is separated from the straw or stalk material. However, additional separating means must be utilized to remove the chaff and beards, as in the case of wheat, from the kernels of grain.

A common and conventional method of further separating the grain from the straw is the use of a straw walker or a straw rack, and this invention is designed to provide an improved straw walker or straw rack grid. The straw walker generally designated as 20 is carried on supports 22 and 23, the supports being carried by crank-shaped shafts 24 and 26 in bearings 28 and 30. Shafts 24 and 26 are of the conventional type in that they provide a reciprocating motion due to their crank design which imparts a to-and-fro motion to the straw walker. It is to be noted that there are usually a plurality of straw rack sections or grids placed side by side and also fore-and-aft so that each of the shafts 24 and 26 commonly carry several bearings, as 28 and 30.

In one embodiment of the invention, the straw walker 20 includes a number of grids or sections, these being the front sections 32 and second, third, fourth and fifth sections 34 as seen in FIG. 1.

It is contemplated to describe a number of grid sections, there being five of sections 32 and twenty of sections 34, it being understood, of course, that the number of individual grids or sections could be varied depending upon the size of the machine. A grid or section 32, as seen in FIGS. 2 and 3, includes a generally flat plate of material 38 and having sides 35 and 36. The reciprocating and oscillating motion of the straw walkers, which is done by virtue of the crank type shafts, continually moves the straw and unthreshed crop material toward the rear of the machine. Sides 35 and 36 have saw tooth portions to carry crop material in a rearward direction so that the straw will be carried across the long portion of the saw tooth, and the short upright portions thus prevent the material from being carried to the forward part of the machine. The grid 32 includes a plate 38 which has a series of grain open areas or openings 40 located at spaced intervals and it is the construction of these openings or grain open areas and the adjacent portions with which this invention is more specifically described.

Plate 38 has a series of upstanding portions 42 and 44 adjacent openings 40, these portions formerly being flat and now extending upwardly at the edges of openings 40 to give a saw tooth effect over substantially the entire plate area. Since the openings 40 and the portions adjacent the openings are identical in construction, only one opening of each type and its portions will be described as typical, regardless of the number of openings or straw walker sections. Portions 42 and 44 are constructed to also be inclined like sides 35 and 36 so as to carry the crop material across the straw walker sections and to also prevent the crop material from moving forwardly of the machine as stated above, in the case of the sides 35 and 36. It is thus seen that this particular construction moves the straw or stalk material unobstructed toward the rear of the machine.

As stated above, FIGS. 2 and 3 show the construction of the first or front straw walker section, the particular construction of the front section being for a specific purpose. The cylinder 12 and the beater 16 travel at a rate of speed such that a large volume of the crop material attains a high velocity as it moves toward the straw rack. This volume of material may land on the second, third and fourth rack sections to be further separated whereas the crop material which is already threshed and separated will fall on the first section after it passes the beater 16. The particular construction of the first section allows the grain to fall through the openings but the long straw and stalk material normally cannot pass through the small openings.

The specific features of the first grid openings will now be described. Section 32, as seen in FIG. 3, also has a downward portion 46 and a rearward portion 48 formed from plate 38. When portions 42 and 44 are bent upwardly and portions 46 and 48 are set downwardly and rearwardly, for instance in a punching or stamping operation, plate 38 defines a formed opening 50 which is left by removal of the above-mentioned portions from the flat plate. It is thus seen in FIG. 2, that a substantial part of the plate material, used when bending portions 42 and 44 and punching or stamping portions 46 and 48, formerly occupied what is now formed opening 50, and that the loss of plate material is minimized in the operation of making the specific structure. This is also seen in FIG. 6 which shows the construction of portion 42 and portions 46 and 48 adjacent the formed opening 50.

The rearward sections 34 of the straw walker are shown in FIGS. 4 and 5, the grid being generally designated as 34 and having side portions 52 and 54 similar to portions 35 and 36 as mentioned above. Grid 34 includes a plate 56 which contains a series of grain open areas or openings 58. These grain open areas are defined by upstanding portions 60 and 62 which are similar to portions 42 and 44 of the areas 40 in the front section. Areas 58 have portions 64 and 66 adjacent a formed opening 68, and portions 64 and portions 66 are inclined. These sections 34 are constructed in this manner to prevent an excess of crop material from flowing entirely through the machine without being completely separated by reason of the high velocity of a large volume of material, as mentioned above. The movement of the material by the cylinder 12 and beater 16 is at such a rate that unthreshed grain would be moved too rapidly to the gathering mechanism. Therefore, the slanting portion 66 will contain the unthreshed material for further separation. The high velocity of a certain amount of the crop material may carry it across the straw rack and onto the ground with the straw, so the portions 66 extend upwardly to contain the grain and move it through the formed openings 68 for complete separation. This construction prevents loss of grain and therefore improves the capacity and efficiency of the machine.

As will be understood, the grain moves unobstructed through the straw walker grid by reason of the slanting portions and the grid provides as much as twenty-five to thirty percent increased open area, compared to prior grids, for the grain to pass through to the cleaning shoe and then to the auger or gathering mechanism. As seen in FIG. 8, grid 70 shows an extreme grain open area, which area is defined by upstanding portions 72 and 74 adjacent a formed opening 76. This configuration could be used in the case of larger grains, such as corn, which would not require portions such as 46, 48 or 64, 66. Formed opening 76 is of such size as to allow unrestricted passage of the larger grains but would prevent the entrance of large stocks or corn cobs.

FIG. 9 shows the plate 38 prior to when it is formed to present the opening 40 and the tangs 42, 44, and 48. Likewise, FIG. 10 shows the plate 56 prior to when it is formed to present the opening 58 and the tangs 60, 62, and 66. That is, in FIGS. 9 and 10 the initial punch-out of openings 50 and 68, respectively, are shown.

The dotted lines show the ultimate positions of the tangs which are formed later as shown in FIGS. 6 and 7.

The above description and the drawings disclose a straw walker which increases the grain open area and the combining capacity and the efficiency of the harvesting machine. The described structure eliminates the conventioned fish back design so as to provide unobstructed movement of crop material toward the rear of the machine and also it utilizes the material, obtained during the manufacturing process, to form the upstanding portions. The walker of this invention is also of less or minimum weight and requires less material.

It is to be understood that variations in the construction and details will doubtless occur to those skilled in the art and that perhaps different arrangements of the straw walker grids could be used to obtain a maximum combining and cleaning capacity. These variations are considered to be within the scope of this application. The construction and arrangement would, of course, be altered for different grains and the above description of the invention is not to be taken as limited in any manner except as defined in the following claims.

What is claimed as new and desired to be secured by Letters Patent of the United States is:

1. In a straw walker for separating the grain from the stalks in a harvester which includes means for reciprocating said straw walker for moving the stalks in a direction along said straw walker and rearwardly of said harvester, a plate portion having a plurality of openings extending through said plate portion in spaced-apart locations, upstanding portions on said plate portion and including upright surfaces for engaging the stalks and moving them in said direction upon reciprocation of said plate portion, the improvement comprising said plate portion being planar and said openings extending transversely through said plate portion and free of any part of said plate portion being aligned with the axis of each of said openings so that said openings are axially unobstructed on said plate portions, said upstanding portions being disposed adjacent the sides of said openings, with respect to the direction of movement of stalks, and said upstanding portions extending integral from said plate portion and terminating in an extending free end defined in part by said upright surface.

2. The subject matter of claim 1, wherein said free end is in the shape of an acute angle.

3. The subject matter of claim 1, including one of said upstanding portions disposed on each side of each of said openings with respect to the direction of movement of the stalks.

4. The subject matter of claim 1, wherein said upstanding portions extend only transverse to said plate portion and only parallel to the axis of each of said openings.

5. The subject matter of claim 4, wherein said upright surfaces extend only transverse to said plate portion.

6. The subject matter of claim 1, including tangs extending integral with and off the plane of said plate portion and across the axis of each of said openings.

7. The subject matter of claim 6, wherein said tangs extend on said plate portion to the side where said upstanding portions are located.

8. The subject matter of claim 6, wherein said tangs extend on said plate portion to the side opposite the location of said upstanding portions.

9. The subject matter of claim 1, wherein said upstanding portions are triangularly shaped with one side thereof being coextensive with each of said openings.

References Cited

UNITED STATES PATENTS

| | | | |
|---|---|---|---|
| 1,617,246 | 2/1927 | Freeman | 130—24 |
| 1,965,782 | 7/1934 | Senzek | 130—24 |
| 2,814,300 | 11/1957 | Oberholtz | 130—24 XR |
| 3,109,433 | 11/1963 | Claas | 130—24 |

ANTONIO F. GUIDA, *Primary Examiner.*